US012806611B2

(12) United States Patent
Moriya et al.

(10) Patent No.: US 12,806,611 B2
(45) Date of Patent: Nov. 24, 2026

(54) EXHAUST GAS PURIFICATION CATALYST

(71) Applicants: MITSUI MINING & SMELTING CO., LTD., Tokyo (JP); HONDA MOTOR CO., LTD., Tokyo (JP)

(72) Inventors: Toshiharu Moriya, Saitama (JP); Junki Tomita, Saitama (JP); Toshiaki Kimura, Tokyo (JP); Koji Ueno, Tokyo (JP); Akiko Iwasa, Tokyo (JP); Takeshi Endo, Tokyo (JP)

(73) Assignees: Mitsui Kinzoku Company, Limited, Tokyo (JP); HONDA MOTOR CO., LTD., Tokyo (JP)

( * ) Notice: Subject to any disclaimer, the term of this patent is extended or adjusted under 35 U.S.C. 154(b) by 387 days.

(21) Appl. No.: 18/699,827

(22) PCT Filed: Oct. 20, 2021

(86) PCT No.: PCT/JP2021/038827
§ 371 (c)(1),
(2) Date: Apr. 9, 2024

(87) PCT Pub. No.: WO2023/067744
PCT Pub. Date: Apr. 27, 2023

(65) Prior Publication Data
US 2024/0399353 A1 Dec. 5, 2024

(51) Int. Cl.
*B01J 35/00* (2024.01)
*B01D 53/94* (2006.01)
(Continued)

(52) U.S. Cl.
CPC .......... *B01J 35/19* (2024.01); *B01D 53/9413* (2013.01); *B01J 23/63* (2013.01); *B01J 33/00* (2013.01);
(Continued)

(58) Field of Classification Search
CPC ... B01J 23/58; B01J 23/63; B01J 35/19; B01J 35/57; B01J 37/0244; B01D 53/945;
(Continued)

(56) References Cited

U.S. PATENT DOCUMENTS 10,159,934 B2 12/2018 Kitamura et al.
2005/0031501 A1 2/2005 Kawai et al.
(Continued)

FOREIGN PATENT DOCUMENTS

CN 111741812 A * 10/2020 ............ B01J 37/088
JP 2004283692 A 10/2004
(Continued)

OTHER PUBLICATIONS

International Search Report (ISR) dated Dec. 14, 2021 filed in PCT/JP2021/038827.

*Primary Examiner* — Jun Li
(74) *Attorney, Agent, or Firm* — RANKIN, HILL & CLARK LLP

(57) ABSTRACT

An object of the present invention is to provide an exhaust gas purification catalyst that can prevent a decrease in the exhaust gas purification performance by phosphorus poisoning, and the present invention provides an exhaust gas purification catalyst (1A), including a substrate (10) and first and second catalyst layers (20, 30) each provided on the substrate (10), wherein the second catalyst layer (30) is provided on an upside or upstream of the first catalyst layer (20), wherein the first catalyst layer (20) contains at least one selected from Pd and Pt, wherein the second catalyst layer (30) contains Rh, Al, and barium sulfate, wherein a mole ratio of a content of Al in the second catalyst layer (30) to a total content of all metal elements in the second catalyst layer (30) is 0.55 or more and 0.85 or less, and wherein a mole ratio of a content of Rh in the second catalyst layer (30)
(Continued)

to a content of Ba in the second catalyst layer (30) is 0.0040 or more and 0.040 or less.

4 Claims, 5 Drawing Sheets

(51) Int. Cl.

| | |
|---|---|
| ***B01J 23/63*** | (2006.01) |
| ***B01J 33/00*** | (2006.01) |
| ***B01J 37/02*** | (2006.01) |
| ***B01J 37/08*** | (2006.01) |
| ***F01N 3/28*** | (2006.01) |
| *B01J 35/57* | (2024.01) |

(52) U.S. Cl.
CPC ....... *B01J 37/0228* (2013.01); *B01J 37/0236* (2013.01); *B01J 37/08* (2013.01); *F01N 3/2803* (2013.01); *B01D 2255/1021* (2013.01); *B01D 2255/1023* (2013.01); *B01D 2255/1025* (2013.01); *B01D 2255/2042* (2013.01); *B01D 2255/2065* (2013.01); *B01D 2255/2092* (2013.01); *B01D 2255/407* (2013.01); *B01D 2255/9022* (2013.01); *B01D 2255/9032* (2013.01); *B01D 2257/404* (2013.01); *B01D 2258/01* (2013.01); *B01J 35/57* (2024.01); *F01N 2370/02* (2013.01); *F01N 2510/0684* (2013.01)

(58) Field of Classification Search
CPC ........ B01D 53/9413; B01D 2255/1021; B01D 2255/1023; B01D 2255/1025; B01D 2255/2042; B01D 2255/2065; B01D 2255/2092; B01D 2255/9022; B01D 2255/9032
See application file for complete search history.

(56) References Cited

U.S. PATENT DOCUMENTS

| | | | | |
|---|---|---|---|---|
| 2009/0275468 | A1 | 11/2009 | Taki et al. | |
| 2013/0029838 | A1* | 1/2013 | Aoki | B01J 27/24 502/304 |
| 2015/0045209 | A1 | 2/2015 | Fujimura et al. | |
| 2020/0263587 | A1 | 8/2020 | Nomura et al. | |

FOREIGN PATENT DOCUMENTS

| | | | | | |
|---|---|---|---|---|---|
| JP | 2008012441 | A | | 1/2008 | |
| JP | 2013027876 | A | | 2/2013 | |
| JP | 2016093760 | A | | 5/2016 | |
| JP | 2018108556 | A | | 7/2018 | |
| JP | 2021146306 | A | * | 9/2021 | |
| WO | WO-2013111457 | A1 | * | 8/2013 | B01J 35/615 |
| WO | WO-2017150350 | A1 | * | 9/2017 | B01J 37/08 |
| WO | WO-2018016601 | A1 | * | 1/2018 | F01N 3/10 |
| WO | WO-2018216817 | A1 | * | 11/2018 | F01N 3/10 |
| WO | 2019065206 | A1 | | 4/2019 | |

* cited by examiner

[FIGURE 1]
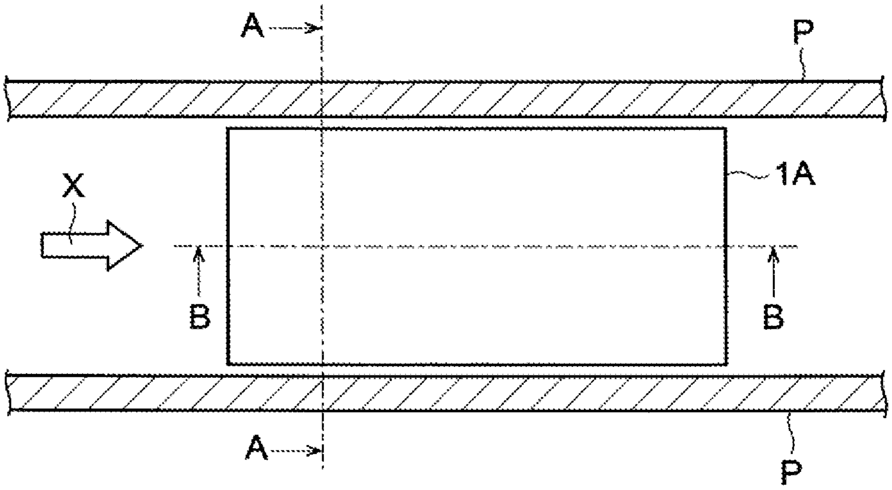

[FIGURE 2]
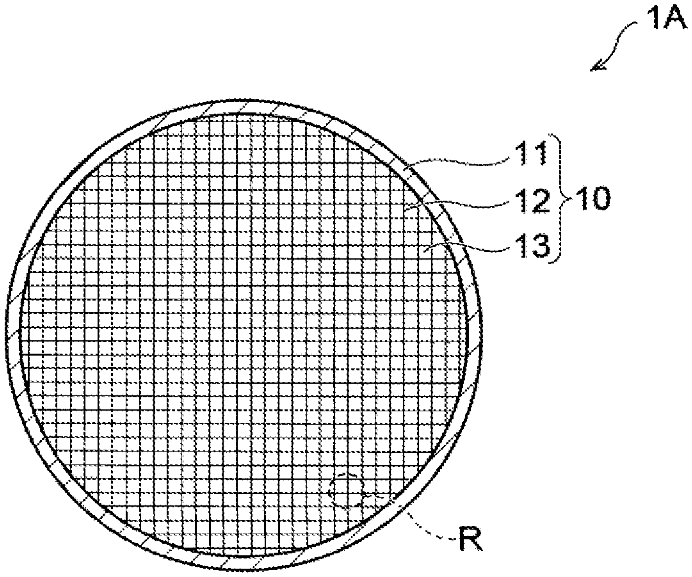

[FIGURE 3]
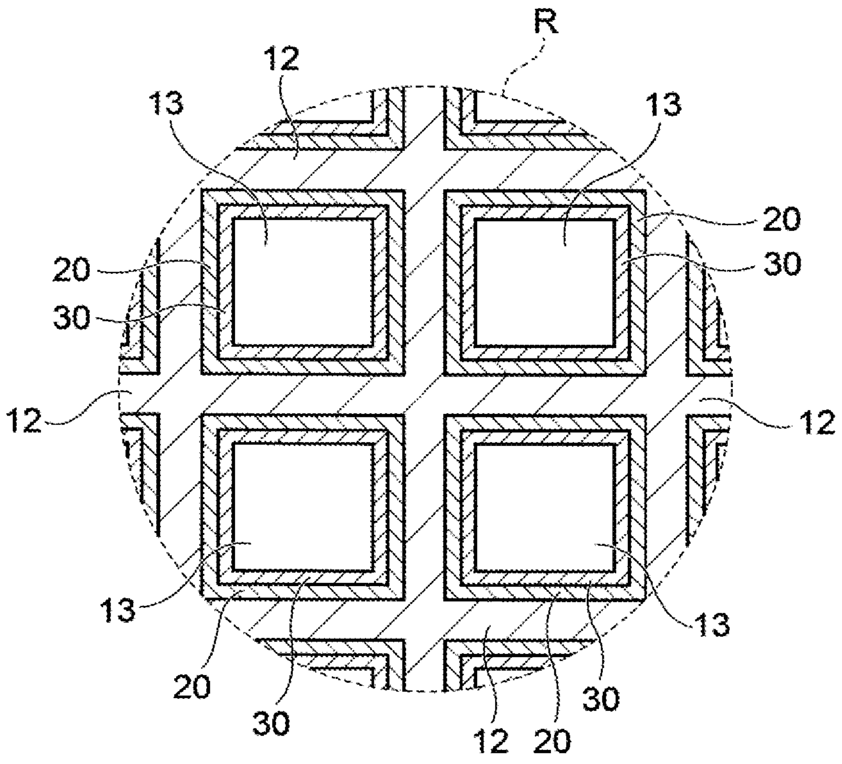

[FIGURE 4]
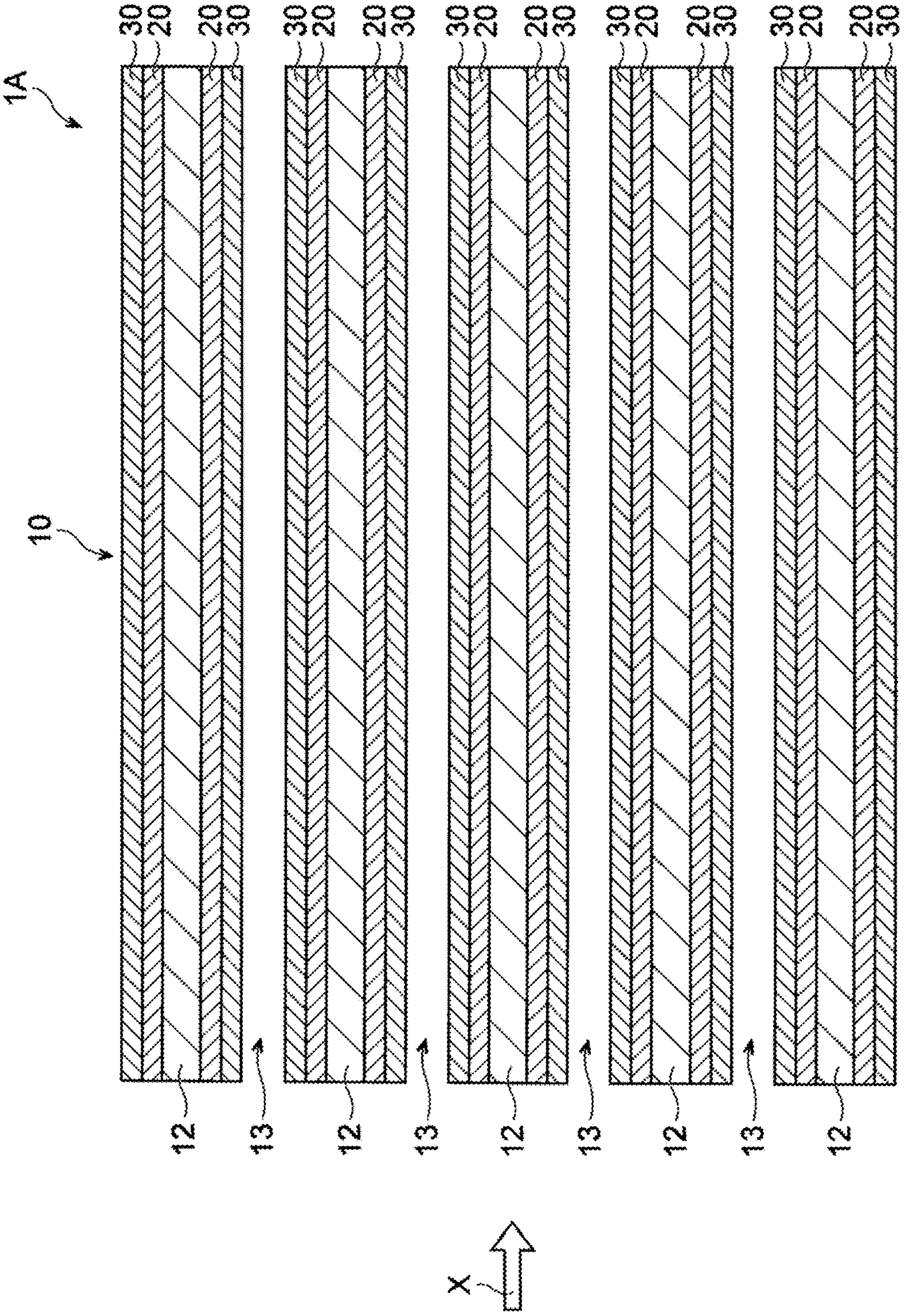

[FIGURE 5]
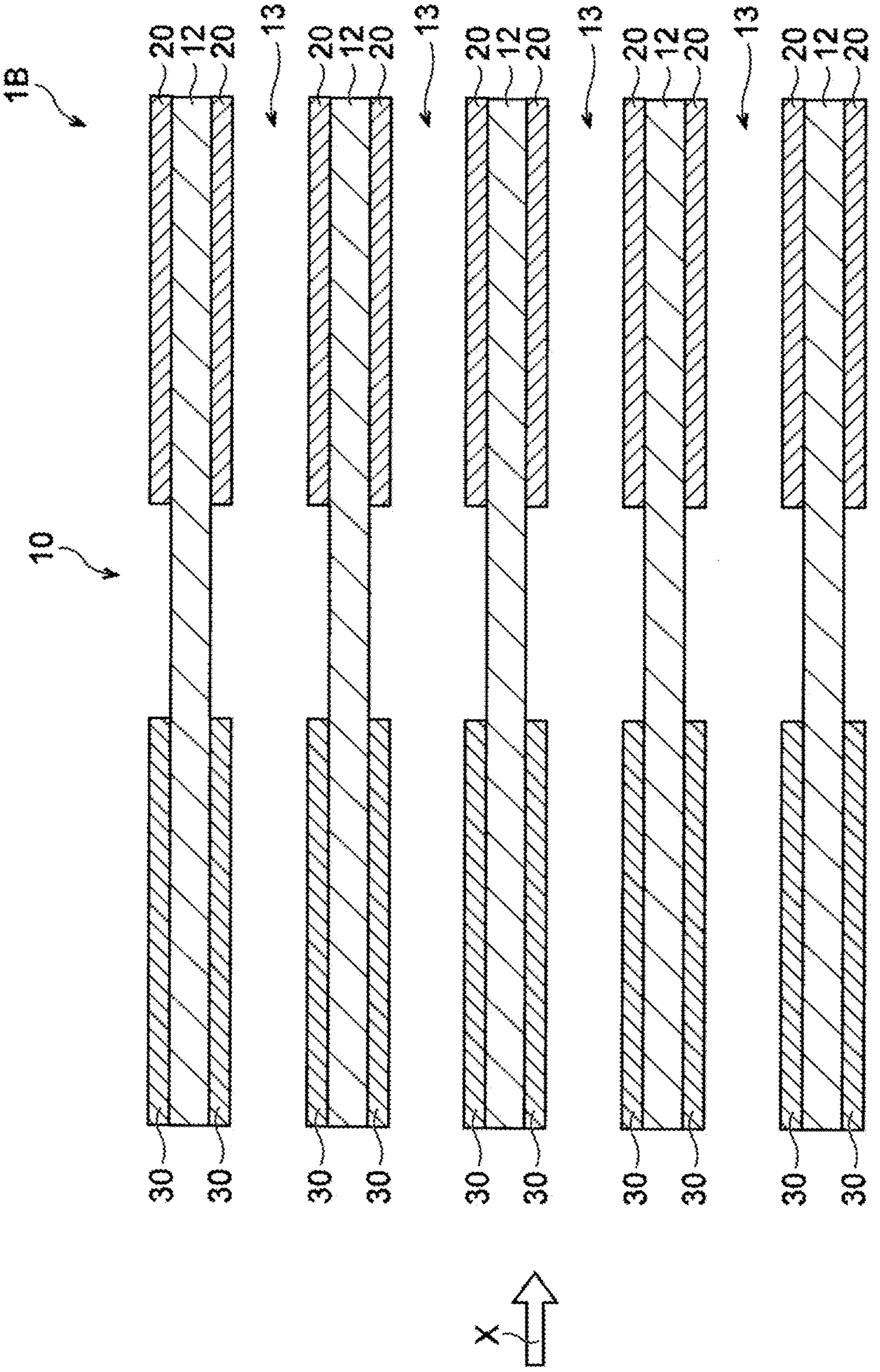

EXHAUST GAS PURIFICATION CATALYST

FIELD OF THE INVENTION

The present invention relates to an exhaust gas purification catalyst.

BACKGROUND ART

Exhaust gas discharged from an internal combustion engine of an automobile, a motorcycle or the like contains harmful components, such as hydrocarbons (THC), carbon monoxide (CO) and nitrogen oxide (NOx). A three-way catalyst is used to purify and detoxify those harmful components. A catalyst containing noble metal elements, such as Pt, Pd and Rh, is used as a three-way catalyst.

Pt and Pd are easily poisoned by phosphorus. Thus, there is a known technique that prevents Pt and/or Pd in a first catalyst layer from being poisoned by providing a second catalyst layer containing Rh and a phosphorus capturing agent on the upside or upstream of the first catalyst layer is known.

As the phosphorus capturing agent, an alkaline earth metal element, such as Ba, is used.

However, when a water-soluble salt of Ba, such as barium acetate, is used, the high dispersibility of Ba in the second catalyst layer makes it easier to come into contact with Rh, which in turn makes it easier for Rh to be stabilized in an oxidized state, thereby preventing Rh from becoming a metallic state. As a result, the exhaust gas purification performance of Rh contained in the second catalyst layer decreases.

Meanwhile, there is a known technique that use a water-insoluble salt of Ba, such as barium sulfate, as a Ba source (for example, Patent Documents 1 and 2). When a water-insoluble salt of Ba, such as barium sulfate, is used as a Ba source, the low dispersibility of Ba in the second catalyst layer prevents a decrease in the exhaust gas purification performance of Rh contained in the second catalyst layer due to stabilization of Rh in an oxidized state. However, the phosphorus capturing performance of the second catalyst layer decreases. As a result, the exhaust gas purification performance of Pt and/or Pd contained in the first catalyst layer decreases due to phosphorus poisoning.

CITATION LIST

Patent Document

Patent Document 1: Japanese Unexamined Patent Application Publication No. 2004-283692

Patent Document 2: Japanese Unexamined Patent Application Publication No. 2018-108556

SUMMARY OF THE INVENTION

Technical Problem

Thus, an object of the present invention is to provide an exhaust gas purification catalyst that can prevent a decrease in the exhaust gas purification performance by phosphorus poisoning, wherein the exhaust gas purification catalyst includes a substrate and first and second catalyst layers each provided on the substrate, wherein the second catalyst layer is provided on an upside or upstream of the first catalyst layer, wherein the first catalyst layer contains at least one selected from Pd and Pt, and wherein the second catalyst layer contains Rh and barium sulfate.

Solution to Problem

In order to solve the above problem, the present invention provides an exhaust gas purification catalyst, including a substrate and first and second catalyst layers each provided on the substrate, wherein the second catalyst layer is provided on an upside or upstream of the first catalyst layer, wherein the first catalyst layer contains at least one selected from Pd and Pt, wherein the second catalyst layer contains Rh, Al, and barium sulfate, wherein a mole ratio of a content of Al in the second catalyst layer to a total content of all metal elements in the second catalyst layer is 0.55 or more and 0.85 or less, and wherein a mole ratio of a content of Rh in the second catalyst layer to a content of Ba in the second catalyst layer is 0.0040 or more and 0.040 or less.

Advantageous Effects of Invention

According to the present invention, there is provided an exhaust gas purification catalyst that can prevent a decrease in the exhaust gas purification performance by phosphorus poisoning.

BRIEF DESCRIPTION OF THE DRAWINGS

FIG. 1 is a partial end view showing a state in which an exhaust gas purification catalyst according to a first embodiment of the present invention is disposed in an exhaust gas path of an internal combustion engine.

FIG. 2 is an end view taken along line A-A of FIG. 1.

FIG. 3 is an enlarged view of a region R in FIG. 2.

FIG. 4 is an end view taken along line B-B of FIG. 1.

FIG. 5 is an end view (end view corresponding to FIG. 4) of an exhaust gas purification catalyst according to a second embodiment of the present invention.

DETAILED DESCRIPTION OF THE INVENTION

Description of Terms

Hereinafter, the terms used herein will be described.

<BET Specific Surface Area>

The BET specific surface area is measured according to JIS R1626, "Measuring methods for the specific surface area of fine ceramic powders by gas adsorption using the BET method," "6.2 Flow method," "(3.5) Single-point method." In this method, a nitrogen-helium gas mixture containing 30% by volume of nitrogen as an adsorption gas and 70% by volume of helium as a carrier gas is used as a gas. "BELSORP-MR6" manufactured by MicrotracBEL Corp. is used as a measurement device.

<Rare Earth Element>

Examples of a rare earth element include Ce, Y, Pr, Sc, La, Nd, Sm, Eu, Gd, Tb, Dy, Ho, Er, Tm, Yb, Lu, and the like. In the present specification, a rare earth element is referred to as "Ln" in some cases.

<Oxide>

An oxide of Al means $Al_2O_3$, an oxide of Si means $SiO_2$, an oxide of B means $B_2O_3$, an oxide of Zr means $ZrO_2$, an oxide of Cr means $Cr_2O_3$, an oxide of Mg means MgO, an oxide of Ca means CaO, an oxide of Sr means SrO, an oxide of Ba means BaO, an oxide of Fe means $Fe_3O_4$, an oxide of Mn means $Mn_3O_4$, and an oxide of Ni means NiO. An oxide of a rare earth element means a sesquioxide ($Ln_2O_3$) except an oxide of Ce, an oxide of Pr, and an oxide of Tb, an oxide of Ce means $CeO_2$, an oxide of Pr means $Pr_6O_{11}$, and an oxide of Tb means $Tb_4O_7$.

<Al-Based Oxide>

An Al-based oxide means an oxide containing Al.

The Al-based oxide is, for example, particulate.

The Al-based oxide is used as a carrier for a catalytically-active component. From the viewpoint of improving the supportability for a catalytically-active component, the Al-based oxide is preferably porous. The Al-based oxide is distinct from alumina used as a binder (hereinafter referred to as "alumina binder"). The alumina binder is derived from alumina sol used as a material for forming a catalyst layer.

The Al-based oxide may or may not contain an element other than Al and O.

The element other than Al and O can be selected from B, Si, rare earth elements (for example, Y, Ce, La, Nd, Pr, and the like), Zr, Cr, and alkaline earth metal elements (for example, Mg, Ca, Sr, Ba, and the like). From the viewpoint of improving the heat resistance of the Al-based oxide, the element other than Al and O is preferably selected from Y, Ce, La, Nd, Pr, and the like.

Examples of the Al-based oxide include alumina (an oxide consisting of Al and O), an oxide obtained by modifying the surface of alumina with the element other than Al and O, and an oxide obtained by dissolving the element other than Al and O in alumina. Examples of the Al-based oxide containing the element other than Al and O include alumina-silica, alumina-silicate, alumina-zirconia, alumina-chromia, alumina-ceria, and alumina-lanthana.

In the Al-based oxide, the element other than Al and O may form a solid solution phase with Al and O, may form a single phase (for example, an oxide phase of the element other than Al and O) which is a crystalline phase or an amorphous phase, or may form both a solid solution phase and a single phase.

From the viewpoint of improving the heat resistance of the Al-based oxide, the content of Al in terms of oxide in the Al-based oxide is preferably 50% by mass or more, more preferably 60% by mass or more, still more preferably 70% by mass or more, still more preferably 80% by mass or more, still more preferably 90% by mass or more, and still more preferably 95% by mass or more, based on the mass of the Al-based oxide. The upper limit is 100% by mass.

In a case where the Al-based oxide contains the element other than Al and O, the content of the element other than Al and O in terms of oxide in the Al-based oxide is preferably 0.1% by mass or more and 50% by mass or less, more preferably 0.1% by mass or more and 40% by mass or less, still more preferably 0.1% by mass or more and 30% by mass or less, still more preferably 0.2% by mass or more and 20% by mass or less, still more preferably 0.3% by mass or more and 10% by mass or less, and still more preferably 0.5% by mass or more and 5% by mass or less, based on the mass of the Al-based oxide, from the viewpoint of improving the heat resistance of the Al-based oxide. The expression "the content of the element other than Al and O in terms of oxide" means, in a case where the Al-based oxide contains two or more types of elements other than Al and O, the total content of the two or more types of elements in terms of oxide.

<Ce-Based Oxide>

A Ce-based oxide means an oxide containing Ce. In a case where, in an oxide containing Al and Ce, the content of Al in terms of oxide is equal to or greater than the content of Ce in terms of oxide, the oxide containing Al and Ce falls into the category of the Al-based oxide. In a case where, in an oxide containing Al and Ce, the content of Al in terms of oxide is less than the content of Ce in terms of oxide, the oxide containing Al and Ce falls into the category of the Ce-based oxide.

The Ce-based oxide is, for example, particulate.

The Ce-based oxide is used as a carrier for a catalytically-active component. From the viewpoint of improving the supportability for a catalytically-active component, the Ce-based oxide is preferably porous. The Ce-based oxide is distinct from ceria used as a binder (hereinafter referred to as "ceria binder"). The ceria binder is derived from ceria sol used as a material for forming a catalyst layer.

The Ce-based oxide may or may not contain an element other than Ce and O.

The element other than Ce and O can be selected from rare earth elements other than Ce, alkaline earth metal elements (for example, Mg, Ca, Sr, Ba, and the like), Fe, Mn, Ni, Zr, Al, and the like.

Examples of the Ce-based oxide include ceria (an oxide consisting of Ce and O), an oxide obtained by modifying the surface of ceria with the element other than Ce and O, and an oxide obtained by dissolving the element other than Ce and O in ceria.

In the Ce-based oxide, the element other than Ce and O may form a solid solution phase with Ce and O, may form a single phase (for example, an oxide phase of the element other than Ce and O) which is a crystalline phase or an amorphous phase, or may form both a solid solution phase and a single phase.

In a Ce-based oxide according to one embodiment (hereinafter referred to as "first Ce-based oxide"), the content of Ce in terms of oxide is preferably more than 90% by mass, more preferably 95% by mass or more, and still more preferably 99% by mass or more, based on the mass of the first Ce-based oxide. The upper limit is 100% by mass.

In a case where the first Ce-based oxide contains the element other than Ce and O, the content of the element other than Ce and O in terms of oxide in the first Ce-based oxide is preferably more than 0% by mass and less than 10% by mass, more preferably more than 0% by mass and 5% by mass or less, and still more preferably more than 0% by mass and 1% by mass or less, based on the mass of the first Ce-based oxide, from the viewpoint of improving the oxygen storage capacity of the first Ce-based oxide. The content of the element other than Ce and O in terms of oxide may be, for example, 0.1% by mass or more, 0.2% by mass or more, or 0.3% by mass or more. The expression "the content of the element other than Ce and O in terms of oxide" means, in a case where the first Ce-based oxide contains two or more types of elements other than Ce and O, the total content of the two or more types of elements in terms of oxide.

In a Ce-based oxide according to another embodiment (hereinafter referred to as "second Ce-based oxide"), the content of Ce in terms of oxide is preferably 1% by mass or more and 90% by mass or less, more preferably 2% by mass or more and 50% by mass or less, and still more preferably 3% by mass or more and 45% by mass or less, based on the mass of the second Ce-based oxide.

The content of the element other than Ce and O in terms of oxide in the second Ce-based oxide is preferably 10% by mass or more and 99% by mass or less, more preferably 50% by mass or more and 98% by mass or less, and still more preferably 55% by mass or more and 97% by mass or less, based on the mass of the second Ce-based oxide, from the viewpoint of improving the heat resistance of the second Ce-based oxide. The expression "the content of the element other than Ce and O in terms of oxide" means, in a case where the second Ce-based oxide contains two or more types of elements other than Ce and O, the total content of the two or more types of elements in terms of oxide.

<Ce-Zr-Based Oxide>

A Ce—Zr-based oxide is one type of the Ce-based oxide (preferably one type of the second Ce-based oxide), and means a complex oxide containing Zr in addition to Ce.

The Ce—Zr-based oxide is, for example, particulate.

The Ce—Zr-based oxide is used as a carrier for a catalytically-active component. From the viewpoint of improving the supportability for a catalytically-active component, the Ce—Zr-based oxide is preferably porous.

In the Ce—Zr-based oxide, Ce may form a solid solution phase with Zr and O, may form a single phase (for example, a single phase of $CeO_2$) which is a crystalline phase or an amorphous phase, or may form both a solid solution phase and a single phase, but it is preferable that at least part of Ce forms a solid solution phase.

In the Ce—Zr-based oxide, Zr may form a solid solution phase with Ce and O, may form a single phase (for example, a single phase of $ZrO_2$) which is a crystalline phase or an amorphous phase, or may form both a solid solution phase and a single phase, but it is preferable that at least part of Zr forms a solid solution phase.

The Ce—Zr-based oxide has an ability to absorb oxygen when the oxygen concentration in exhaust gas is high and release oxygen when the oxygen concentration in exhaust gas is low (i.e., an oxygen storage capacity), and mitigate fluctuations in the oxygen concentration in exhaust gas and expand the operating window of a catalytically active component. Therefore, when the Ce—Zr-based oxide is used, the exhaust gas purification performance of an exhaust gas purification catalyst is improved. Zr mainly contributes to the improvement of the heat resistance of the Ce—Zr-based oxide, and Ce mainly contributes to the improvement of the oxygen storage capacity of the Ce—Zr-based oxide.

In the Ce—Zr-based oxide, the total of the content of Ce in terms of oxide and the content of Zr in terms of oxide is preferably 60% by mass or more, more preferably 70% by mass or more, and still more preferably 80% by mass or more, based on the mass of the Ce—Zr-based oxide, from the viewpoint of improving the heat resistance and the oxygen storage capacity. The upper limit is 100% by mass.

In the Ce—Zr-based oxide, the content of Ce in terms of oxide is preferably 5% by mass or more and 90% by mass or less, more preferably 7% by mass or more and 60% by mass or less, and still more preferably 10% by mass or more and 50% by mass or less, based on the mass of the Ce—Zr-based oxide, from the viewpoint of improving the oxygen storage capacity.

In the Ce—Zr-based oxide, the content of Zr in terms of oxide is preferably 10% by mass or more and 95% by mass or less, more preferably 40% by mass or more and 95% by mass or less, and still more preferably 50% by mass or more and 90% by mass or less, based on the mass of the Ce—Zr-based oxide, from the viewpoint of improving the heat resistance.

The Ce—Zr-based oxide may contain a rare earth element (Ln) other than Ce, an alkaline earth metal element (for example, Mg, Ca, Sr, Ba, or the like), Fe, Mn, Ni, Al, or the like.

In a case where the Ce—Zr-based oxide contains Ln other than Ce, Ln other than Ce is preferably selected from La, Nd, Pr, Y, Gd, Sm, and the like, and more preferably selected from La, Nd, Pr, Y, and the like, from the viewpoint of improving the heat resistance of the Ce—Zr-based oxide.

In a case where the Ce—Zr-based oxide contains Ln other than Ce, Ln other than Ce may form a solid solution phase with Zr and/or Ce and O, may form a single phase (for example, a single phase of an oxide of Ln other than Ce) which is a crystalline phase or an amorphous phase, or may form both a solid solution phase and a single phase, but it is preferable that at least part of Ln other than Ce forms a solid solution phase.

In a case where the Ce—Zr-based oxide contains Ln other than Ce, the content of Ln other than Ce in terms of oxide in the Ce—Zr-based oxide is preferably 1% by mass or more and 40% by mass or less, more preferably 3% by mass or more and 30% by mass or less, and still more preferably 5% by mass or more and 20% by mass or less, based on the mass of the Ce—Zr-based oxide, from the viewpoint of improving the heat resistance. The expression "the content of Ln other than Ce in terms of oxide" means, in a case where the Ce—Zr-based oxide contains two or more types of Ln other than Ce, the total content of the two or more types of Ln in terms of oxide.

In a case where the Ce—Zr-based oxide contains Al, Al may form a solid solution phase with Zr and/or Ce and O, may form a single phase (for example, a single phase of an oxide of Al) which is a crystalline phase or an amorphous phase, or may form both a solid solution phase and a single phase, but it is preferable that at least part of Al forms a solid solution phase.

In a case where the Ce—Zr-based oxide contains Al, the content of Al in terms of oxide in the Ce—Zr-based oxide is preferably 3% by mass or more and 40% by mass or less, more preferably 5% by mass or more and 30% by mass or less, and still more preferably 10% by mass or more and 20% by mass or less, based on the mass of the Ce—Zr-based oxide, from the viewpoint of improving the heat resistance of the Ce—Zr-based oxide.

First Embodiment

Hereinafter, an exhaust gas purification catalyst 1A according to a first embodiment of the present invention will be described with reference to FIGS. 1 to 4.

As shown in FIG. 1, the exhaust gas purification catalyst 1A is disposed in an exhaust gas path in an exhaust pipe P of an internal combustion engine. The internal combustion engine is, for example, a gasoline engine. Exhaust gas emitted from the internal combustion engine flows through the exhaust gas path in the exhaust pipe P from one end to the other end of the exhaust pipe P, and is purified by the exhaust gas purification catalyst 1A provided in the exhaust pipe P. In the drawings, the exhaust gas flow direction is denoted by the reference sign X. The upstream position in the exhaust gas flow direction X is referred to as "exhaust gas inflow side," and the downstream position in the exhaust gas flow direction X is referred to as "exhaust gas outflow side," in some cases.

In addition to the exhaust gas purification catalyst 1A, another exhaust gas purification catalyst may be disposed in the exhaust gas path in the exhaust pipe P. For example, the exhaust gas purification catalyst 1A may be disposed upstream in the exhaust gas path in the exhaust pipe P, and another exhaust gas purification catalyst may be disposed downstream in the exhaust gas path in the exhaust pipe P.

As shown in FIGS. 2 to 4, the exhaust gas purification catalyst 1A includes a substrate 10, a first catalyst layer 20 provided on the substrate 10, and a second catalyst layer 30 provided on the substrate 10.

<Substrate>

Hereinafter, the substrate 10 will be described.

The material of the substrate 10 can be selected as appropriate. The material of the substrate 10 is preferably a material that allows the substrate 10 to stably maintain its shape even when the substrate 10 is exposed to an exhaust gas at a high temperature. Examples of the material of the substrate 10 include a ceramic material and a metallic material. Examples of the ceramic material include cordierite, silicon carbide, and aluminum titanate. Examples of the metallic material include alloys, such as stainless steel.

In the present specification, the term "high temperature" means a temperature of preferably 850° C. or more, and more preferably 900° C. or more.

As shown in FIGS. 2 to 4, the substrate 10 includes a tubular member 11, a partition wall 12 provided in the tubular member 11, and cells 13 separated from one another by the partition wall 12. The substrate 10 preferably has a honeycomb structure.

As shown in FIG. 2, the tubular member 11 has a hollow cylindrical shape, but may have another shape, such as a hollow elliptic cylindrical shape or a polygonal tubular shape.

As shown in FIGS. 2 to 4, the partition wall 12 is present between adjacent cells 13, whereby the adjacent cells 13 are separated from each other by the partition wall 12. The thickness of the partition wall 12 is, for example, 20 μm or more and 1500 μm or less. The partition wall 12 may have a porous structure allowing exhaust gas to pass through.

As shown in FIG. 4, each cell 13 extends in the exhaust gas flow direction X and has an end on the exhaust gas inflow side and an end on the exhaust gas outflow side.

As shown in FIG. 4, the end on the exhaust gas inflow side and the end on the exhaust gas outflow side of each cell 13 are both open. Therefore, the exhaust gas that has flowed in from the end (opening) on the exhaust gas inflow side of each cell 13 flows out from the end (opening) on the exhaust gas outflow side of each cell 13. Such a mode is called a flow-through type.

As shown in FIGS. 2 and 3, the shape in a plan view of the end (opening) on the exhaust gas inflow side of each cell 13 is rectangle, but may be another shape, such as hexagon or octagon. The same applies to the shape in a plan view of the end (opening) on the exhaust gas outflow side of each cell 13.

The cell density per square inch of the substrate 10 is, for example, 100 cells or more and 1000 cells or less. The cell density per square inch of the substrate 10 means the total number of the cells 13 per square inch in a cross-section obtained by cutting the substrate 10 by a plane perpendicular to the exhaust gas flow direction X.

The volume of the substrate 10 is, for example, 0.1 L or more and 20 L or less. The volume of substrate 10 means the apparent volume of substrate 10. In a case where the substrate 10 is in the form of a cylinder, the outer diameter of the substrate 10 is 2r, and the length of the substrate 10 is L, the volume of the substrate 10 is represented by the formula: Volume of substrate $10=\pi\times r^2\times L$.

The substrate 10 may be provided with a first sealing member that seals the ends on the exhaust gas outflow side of some of the cells 13 and a second sealing member that seals the ends on the exhaust gas inflow side of the remaining cells 13, so that some of the cells 13 are each an inflow-side cell in which the end on the exhaust gas inflow side is open and the end on the exhaust gas outflow side is closed by the first sealing member, and the remaining cells 13 are each an outflow-side cell in which the end on the exhaust gas inflow side is closed by the second sealing member and the end on the exhaust gas outflow side is open. A plurality of (for example, four) outflow-side cells are arranged around and adjacent to one inflow-side cell, and the inflow-side cell and the outflow-side cells adjacent to the inflow-side cell are separated from one another by the porous partition wall 12. The exhaust gas that has flowed in from the end (opening) on the exhaust gas inflow side of the inflow-side cell passes through the porous partition wall 12 and flows out from the end (opening) on the exhaust gas outflow side of the outflow-side cell. Such a mode is called a wall-flow type.

<First Catalyst Layer>

Hereinafter, the first catalyst layer 20 will be described.

As shown in FIGS. 3 and 4, the first catalyst layer 20 is provided on the surface on the cell 13 side of the partition wall 12 of the substrate 10. The expression "the surface on the cell 13 side of the partition wall 12" means the outer surface of the partition wall 12, extending in the exhaust gas flow direction X. The first catalyst layer 20 may be provided directly or via another layer, on the surface on the cell 13 side of the partition wall 12 of the substrate 10. Usually, the first catalyst layer 20 is provided directly on the surface on the cell 13 side of the partition wall 12 of the substrate 10.

As shown in FIG. 4, the first catalyst layer 20 extends from the end on the exhaust gas inflow side of the partition wall 12 to the end on the exhaust gas outflow side of the partition wall 12 along the exhaust gas flow direction X. The first catalyst layer 20 may extend from the end on the exhaust gas inflow side of the partition wall 12 along the exhaust gas flow direction X so as not to reach the end on the exhaust gas outflow side of the partition wall 12, or may extend from the end on the exhaust gas outflow side of the partition wall 12 along the direction opposite to the exhaust gas flow direction X so as not to reach the end on the exhaust gas inflow side of the partition wall 12.

From the viewpoint of balancing the exhaust gas purification performance and the cost, the mass (mass after drying and calcining) of the first catalyst layer 20 per unit volume of the substrate 10 is preferably 50 g/L or more and 150 g/L or less, more preferably 70 g/L or more and 120 g/L or less, and still more preferably 80 g/L or more and 100 g/L or less.

The first catalyst layer 20 contains at least one selected from Pd and Pt.

Pd and Pt are each contained in the first catalyst layer 20 in a form that can function as a catalytically-active component, for example, in the form of metal Pd, metal Pt, an alloy containing Pd or Pt, a compound containing Pd or Pt (for example, an oxide of Pd or Pt), or the like. The catalytically-active component is for example, particulate.

From the viewpoint of balancing the exhaust gas purification performance and the cost, the content of Pd in the first catalyst layer 20 is preferably 0.1 g/L or more and 2.5 g/L or less, more preferably 0.2 g/L or more and 2.1 g/L or less, and still more preferably 0.3 g/L or more and 1.6 g/L or less, in terms of the content of Pd per unit volume of the substrate 10. For the same viewpoint, the content of Pt in the first catalyst layer 20 is preferably 0.0050 g/L or more and 0.15 g/L or less, more preferably 0.010 g/L or more and 0.12 g/L or less, and still more preferably 0.015 g/L or more and 0.090 g/L or less, in terms of the content of Pt per unit volume of the substrate 10. The contents of Pd and Pt each mean the contents of Pd and Pt in terms of metal, respectively.

The contents of Pd and Pt in the first catalyst layer 20 can be each measured in the same manner as the content of Al in the second catalyst layer 30 described below.

From the viewpoint of improving the exhaust gas purification performance, it is preferable that the first catalyst layer 20 contains a carrier, and that the catalytically-active component is supported on the carrier.

The expression that "the catalytically-active component is supported on the carrier" means a state in which the catalytically-active component is physically or chemically adsorbed or retained on the outer surface, or the inner surface of the pores, of the carrier. The fact that the catalytically-active component is supported on the carrier can be confirmed, for example, by a scanning electron microscope-energy dispersive X-ray spectroscopy (SEM-EDX) or the like.

Examples of the carrier include inorganic oxide. The inorganic oxide is, for example, particulate. Examples of the inorganic oxide include an Al-based oxide, a Ce-based oxide, and the like.

The first catalyst layer 20 may contain two types of carriers. For example, the first catalyst layer 20 may contain at least one Al-based oxide and at least one Ce-based oxide.

The first catalyst layer 20 may contain a binder. Examples of the binder include inorganic binders, such as alumina, zirconia, titania, silica, and ceria.

<Second Catalyst Layer>

Hereinafter, the second catalyst layer 30 will be described.

As shown in FIGS. 3 and 4, the second catalyst layer 30 is provided on the upside of the first catalyst layer 20. Thus, exhaust gas that has flowed in from the end (opening) on the exhaust gas inflow side of the cell 13 contacts with the second catalyst layer 30, and then contacts with the first catalyst layer 20. When the exhaust gas contacts with the second catalyst layer 30, phosphorus in the exhaust gas is captured by barium sulfate in the second catalyst layer 30. This prevents phosphorus from poisoning Pd and/or Pt contained in the first catalyst layer 20.

The expression that "the second catalyst layer 30 is provided on the upside of the first catalyst layer 20" means that a part or the whole of the second catalyst layer 30 is present on, of the two principal surfaces of the first catalyst layer 20, the principal surface opposite to the principal surface on the partition wall 12 side of the substrate 10. The expression "the principal surface of the first catalyst layer 20" means the outer surface of the first catalyst layer 20, extending in the exhaust gas flow direction X. The second catalyst layer 30 may be provided directly or via another layer, on the principal surface of the first catalyst layer 20. Usually, the second catalyst layer 30 is provided directly on the principal surface of the first catalyst layer 20.

As shown in FIG. 4, the second catalyst layer 30 extends from the end on the exhaust gas inflow side of the partition wall 12 to the end on the exhaust gas outflow side of the partition wall 12 along the exhaust gas flow direction X. The second catalyst layer 30 may extend from the end on the exhaust gas inflow side of the partition wall 12 along the exhaust gas flow direction X so as not to reach the end on the exhaust gas outflow side of the partition wall 12, or may extend from the end on the exhaust gas outflow side of the partition wall 12 along the direction opposite to the exhaust gas flow direction X so as not to reach the end on the exhaust gas inflow side of the partition wall 12.

From the viewpoint of balancing the exhaust gas purification performance and the cost, the mass (mass after drying and calcining) of the second catalyst layer 30 per unit volume of the substrate 10 is preferably 50 g/L or more and 150 g/L or less, more preferably 70 g/L or more and 120 g/L or less, and still more preferably 80 g/L or more and 100 g/L or less.

The second catalyst layer 30 contains Rh, Al, and barium sulfate.

Rh is contained in the second catalyst layer 30 in a form that can function as a catalytically-active component, for example, in the form of metal Rh, an alloy containing Rh, a compound containing Rh (for example, an oxide of Rh), or the like. The catalytically-active component is for example, particulate.

From the viewpoint of balancing the exhaust gas purification performance and the cost, the content of Rh in the second catalyst layer 30 is preferably 0.0050 g/L or more and 0.15 g/L or less, more preferably 0.010 g/L or more and 0.12 g/L or less, and still more preferably 0.015 g/L or more and 0.090 g/L or less, in terms of the content of Rh per unit volume of the substrate 10. The content of Rh means the content of Rh in terms of metal.

Whether the second catalyst layer 30 contains barium sulfate can be confirmed, for example, by using an electron probe micro analyzer (EPMA), scanning electron microscope-energy dispersive X-ray spectrometer (SEM-EDX), or the like to perform elemental mapping of a cut surface of the second catalyst layer 30 and by observing the overlap between the distribution of Ba and the distribution of S.

From the viewpoint of balancing the phosphorus capturing performance and the exhaust gas purification performance of Rh, the content of barium sulfate in the second catalyst layer 30 is preferably 1.0 g/L or more and 15 g/L or less, more preferably 4.0 g/L or more and 12 g/L or less, and still more preferably 7.0 g/L or more and 9.0 g/L or less, based on unit volume of the substrate 10.

The second catalyst layer 30 may contain a Ba source other than barium sulfate. Examples of the Ba source other than barium sulfate include a water-soluble salt of Ba, an Al-based oxide containing Ba, and a Ce-based oxide containing Ba.

The mole ratio of the content of Rh in the second catalyst layer 30 to the content of Ba in the second catalyst layer 30 is preferably 0.0040 or more and 0.040 or less, more preferably 0.0045 or more and 0.020 or less, and still more preferably 0.0050 or more and 0.010 or less.

When the ratio of the content of Rh in the second catalyst layer 30 to the content of Ba in the second catalyst layer 30 is in the above range, the frequency of contact between Rh and Ba is moderate, and this prevents a decrease in the exhaust gas purification performance of Rh contained in the second catalyst layer due to stabilization of Rh in an oxidized state.

From the viewpoint of more effectively preventing a decrease in the exhaust gas purification performance of Rh contained in the second catalyst layer due to stabilization of Rh in an oxidized state, the mole ratio of the content of Ba in the second catalyst layer 30 to the total content of all metal elements in the second catalyst layer 30 is preferably 0.005 or more and 0.060 or less, more preferably 0.015 or more and 0.045 or less, and still more preferably 0.025 or more and 0.035 or less. The expression "the content of Ba in the second catalyst layer 30" means, in a case where the second catalyst layer 30 contains one type of Ba source, the content of Ba derived from the one type of Ba source, and, in a case where the second catalyst layer 30 contains two or more types of Ba sources, the total content of Ba derived from the two or more types of Ba sources.

From the viewpoint of more effectively preventing a decrease in the exhaust gas purification performance of Rh contained in the second catalyst layer due to stabilization of Rh in an oxidized state, of the content of Ba in the second catalyst layer 30, the proportion of the content of Ba derived from barium sulfate is preferably 80% by mole or more, more preferably 90% by mole or more, and still more preferably 95% by mole or more. The upper limit of the proportion is 100% by mole. The fact that the proportion is 100% by mole means that barium sulfate is the only Ba source contained in the second catalyst layer 30.

Of the content of Ba in the second catalyst layer 30, the proportion of the content of Ba derived from barium sulfate can be measured as follows.

First, the contents of Ba and S in the second catalyst layer 30 are determined. At this time, the contents of Ba and S in the second catalyst layer 30 can be each measured in the same manner as the content of Al in the second catalyst layer 30 described below.

Barium sulfate is the only S source contained in the second catalyst layer 30. Therefore, in a case where the content of S≥the content of Ba, of the content of Ba in the second catalyst layer 30, the proportion of Ba derived from barium sulfate is 100 mol %.

In a case where the content of S<the content of Ba, of the content of Ba in the second catalyst layer 30, the proportion of Ba derived from barium sulfate is calculated according to the following expression: proportion of Ba derived from barium sulfate (mol %)=(content of S/content of Ba)×100.

When the ratio of the content of Rh in the second catalyst layer 30 to the content of Ba in the second catalyst layer 30 is in the above range, there is a concern that the content of Rh in the second catalyst layer 30 may be insufficient. From the viewpoint of compensating for the insufficient content of Rh and improving the exhaust gas purification performance, the second catalyst layer 30 preferably further contains at least one selected from Pd and Pt.

Pd and Pt are each contained in the second catalyst layer 30 in a form that can function as a catalytically-active component, for example, in the form of metal Pd, metal Pt, an alloy containing Pd or Pt, a compound containing Pd or Pt (for example, an oxide of Pd or Pt), or the like. The catalytically-active component is for example, particulate.

From the viewpoint of balancing the exhaust gas purification performance and the cost, the content of Pd in the second catalyst layer 30 is preferably 0.0050 g/L or more and 0.10 g/L or less, more preferably 0.010 g/L or more and 0.20 g/L or less, and still more preferably 0.015 g/L or more and 0.35 g/L or less, in terms of the content of Pd per unit volume of the substrate 10. For the same viewpoint, the content of Pt in the second catalyst layer 30 is preferably 0.0050 g/L or more and 0.15 g/L or less, more preferably 0.010 g/L or more and 0.12 g/L or less, and still more preferably 0.015 g/L or more and 0.090 g/L or less, in terms of the content of Pt per unit volume of the substrate 10. The contents of Pd and Pt each mean the contents of Pd and Pt in terms of metal, respectively.

The contents of Rh, Pd, Pt, and Ba in the second catalyst layer 30 can be each measured in the same manner as the content of Al in the second catalyst layer 30 described below.

From the viewpoint of improving the exhaust gas purification performance, it is preferable that the second catalyst layer 30 contains a carrier, and that the catalytically-active component is supported on the carrier. The meaning of the expression "supported", and the method of confirming the fact that the catalytically-active component is supported on the carrier, and examples of the carrier are the same as described above.

The second catalyst layer 30 may contain two types of carriers. For example, the second catalyst layer 30 may contain at least one Al-based oxide and at least one Ce-based oxide.

The second catalyst layer 30 may contain a binder. Examples of the binder include inorganic binders, such as alumina, zirconia, titania, silica, and ceria.

The second catalyst layer 30 contains one or two or more types of Al sources.

The Al source is an oxide containing Al. Examples of the Al source include an Al-based oxide, a Ce-based oxide containing Al, an alumina binder, and the like.

The second catalyst layer 30 preferably contains as the Al source at least one Al-based oxide. The second catalyst layer 30 may further contain as the Al source at least one selected from a Ce-based oxide containing Al and an alumina binder. In one embodiment, the second catalyst layer 30 contains as the Al source at least one Al-based oxide and an alumina binder.

The mole ratio of the content of Al in the second catalyst layer 30 to the total content of all metal elements in the second catalyst layer 30 is preferably 0.55 or more and 0.85 or less, more preferably 0.65 or more and 0.85 or less, and still more preferably 0.75 or more and 0.80 or less. The expression "the content of Al in the second catalyst layer 30" means, in a case where the second catalyst layer 30 contains one type of Al source, the content of Al derived from the one type of Al source, and, in a case where the second catalyst layer 30 contains two or more types of Al sources, the total content of Al derived from the two or more types of Al sources.

The oxide containing Al has a larger specific surface area compared to the other materials contained in the second catalyst layer 30. In addition, the oxide containing Al has high heat resistance and the specific surface area is maintained even after exposure to a high temperature environment. Therefore, when the ratio of the content of Al in the second catalyst layer 30 to the total content of all metal elements in the second catalyst layer 30 is in the above range, the dispersibility of barium sulfate in the second catalyst layer 30 is improved. Furthermore, the dispersibility of barium sulfate is maintained even after exposure to a high temperature environment. As a result, the phosphorus capturing performance of the second catalyst layer is improved, and a decrease in the exhaust gas purification performance of Pt and/or Pd contained in the first catalyst layer due to phosphorus poisoning is prevented.

The second catalyst layer 30 preferably contains a γ-alumina phase. The γ-alumina phase is derived from an oxide containing Al (preferably at least one Al-based oxide), which is used as the Al source. When the oxide containing Al contains a γ-alumina phase, the specific surface area of the oxide containing Al increases and the dispersibility of barium sulfate in the second catalyst layer 30 is improved. As a result, the phosphorus capturing performance of the second catalyst layer is improved, and a decrease in the exhaust gas purification performance of Pt and/or Pd contained in the first catalyst layer due to phosphorus poisoning is prevented.

The second catalyst layer 30 may contain another alumina phase (for example, an α-alumina phase, a θ-alumina phase, or the like). The other alumina phase is derived from an oxide containing Al (preferably at least one Al-based oxide), which is used as the Al source.

In a case where the composition of the raw materials used to form the second catalyst layer 30 is known, the content of Al in the second catalyst layer 30 can be calculated from the composition of the raw materials used to form the second catalyst layer 30.

Alternatively, the content of Al in the second catalyst layer 30 can be measured using a conventional method, such as scanning electron microscopy-energy dispersive X-ray spectroscopy (SEM-EDX), X-ray fluorescence analysis (XRF), inductively coupled plasma-atomic emission spectroscopy (ICP-AES), or the like. A specific example is as mentioned below.

First, a test piece cut out of the exhaust gas purification catalyst 1A is pulverized and then analyzed by XRF or ICP-AES, so that among metal elements large in content, top 20 metal elements are identified. One of the 20 metal elements identified is Al. The test piece may contain a portion derived from the substrate 10 and/or a portion derived from the first catalyst layer 20 as long as the test piece contains a portion derived from the second catalyst layer 30. In a case where the test piece contains a portion derived from the substrate 10 and/or a portion derived from the first catalyst layer 20, the 20 metal elements identified may contain a metal element constituting the substrate 10 and/or a metal element constituting the first catalyst layer 20.

Then, the second catalyst layer 30 is analyzed by SEM-EDX. In SEM-EDX, the 20 metal elements identified above are used as analysis objects, and from each of 10 fields of view in SEM, the mol % value of each metal element is analyzed, assuming that the total mol % value of the 20 metal elements is 100 mol %. The average of the mol % values of Al in the 10 fields of view is regarded as the content of Al in the second catalyst layer 30.

The contents of other metal elements in the second catalyst layer 30 can be each calculated or measured in the same manner as the content of Al in the second catalyst layer 30.

Of the content of Al in the second catalyst layer 30, the proportion of the content of Al derived from the Al-based oxide is preferably 80% by mass or more, more preferably 90% by mass or more, and still more preferably 95% by mass or more. The upper limit of the proportion is 100% by mass. The expression "the content of Al derived from the Al-based oxide" means, in a case where the second catalyst layer 30 contains one type of Al-based oxide, the content of Al derived from the one type of Al-based oxide, and, in a case where the second catalyst layer 30 contains two or more types of Al-based oxides, the total content of Al derived from the two or more types of Al-based oxides.

The second catalyst layer 30 preferably contains Ce.

In a case where the second catalyst layer 30 contains Ce, the second catalyst layer 30 contains one or two or more types of Ce sources.

The Ce source is an oxide containing Ce. Examples of the Ce source include an Al-based oxide containing Ce, a Ce-based oxide, a ceria binder, and the like. The Ce source is not necessarily different from the Al source and may be the same oxide as the Al source. For example, each of an Al-based oxide containing Ce and a Ce-based oxide containing Al is not only the Al source, but also the Ce source.

The second catalyst layer 30 preferably contains as the Ce source at least one Ce-based oxide, and more preferably contains as the Ce source at least one of the second Ce-based oxide (in particular Ce—Zr-based oxide). The second catalyst layer 30 may further contain as the Ce source at least one selected from an Al-based oxide containing Ce and a ceria binder. In one embodiment, the second catalyst layer 30 contains as the Ce source at least one Ce-based oxide (preferably, at least one of the second Ce-based oxide, in particular, at least one Ce—Zr-based oxide) and a ceria binder.

The mole ratio of the content of Ce in the second catalyst layer 30 to the total content of all metal elements in the second catalyst layer 30 is preferably 0.020 or more and 0.050 or less, more preferably 0.020 or more and 0.040 or less, and still more preferably 0.025 or more and 0.030 or less. The expression "the content of Ce in the second catalyst layer 30" means, in a case where the second catalyst layer 30 contains one type of Ce source, the content of Ce derived from the one type of Ce source, and, in a case where the second catalyst layer 30 contains two or more types of Ce sources, the total content of Ce derived from the two or more types of Ce sources.

When the ratio of the content of Ce in the second catalyst layer 30 to the total content of all metal elements in the second catalyst layer 30 is in the above range, the frequency of contact between Rh and Ce is moderate, and this can prevent a decrease in the exhaust gas purification performance of Rh contained in the second catalyst layer due to stabilization of Rh in an oxidized state and improve the exhaust gas purification performance. In a case where the second catalyst layer 30 contains at least one selected from Pd and Pt, when the ratio of the content of Ce in the second catalyst layer 30 to the total content of all metal elements in the second catalyst layer 30 is in the above range, the frequency of contact between Ce and the at least one selected from Pd and Pt is moderate, and this can effectively demonstrate the oxygen storage capacity by Ce and improve the exhaust gas purification performance.

Of the content of Ce in the second catalyst layer 30, the proportion of the content of Ce derived from the Ce-based oxide is preferably 80% by mass or more, more preferably 90% by mass or more, and still more preferably 95% by mass or more. The upper limit of the proportion is 100% by mass. The expression "the content of Ce derived from the Ce-based oxide" means, in a case where the second catalyst layer 30 contains one type of Ce-based oxide, the content of Ce derived from the one type of Ce-based oxide, and, in a case where the second catalyst layer 30 contains two or more types of Ce-based oxides, the total content of Ce derived from the two or more types of Ce-based oxides.

<Production Method of Exhaust Gas Purification Catalyst>

The exhaust gas purification catalyst 1A can be produced by forming the first catalyst layer 20 on the substrate 10 and then forming the second catalyst layer 30 on the upside of the first catalyst layer 20.

The first catalyst layer 20 can be formed by mixing a supply source of a noble metal element (for example, a noble metal salt, or the like), and (an)other component(s) (for example, an inorganic oxide(s), such as an Al-based oxide and/or an Ce-based oxide, a binder, a solvent, and/or the like) to prepare a first slurry, coating the partition wall 12 of the substrate 10 with the first slurry, drying the resulting substrate, and calcining the resulting substrate.

The second catalyst layer 30 can be formed by mixing a supply source of a noble metal element (for example, a noble metal salt, or the like), and (an)other component(s) (for example, an inorganic oxide(s), such as an Al-based oxide and/or an Ce-based oxide, barium sulfate, a binder, a solvent, and/or the like) to prepare a second slurry, coating the first catalyst layer 20 with the second slurry, drying the resulting substrate, and calcining the resulting substrate.

From the viewpoint of improving the supportability for a catalytically-active component, the inorganic oxide used as a carrier for a catalytically-active component is preferably porous. The BET specific surface area of the Al-based oxide is preferably 50 $m^2/g$ or more and 200 $m^2/g$ or less, more preferably 80 $m^2/g$ or more and 150 $m^2/g$ or less. The BET specific surface area of the Ce-based oxide is preferably 20 $m^2/g$ or more and 100 $m^2/g$ or less, more preferably 30 $m^2/g$ or more and 90 $m^2/g$ or less.

Examples of the binder include metal oxide sols, such as alumina sol, zirconia sol, titania sol, silica sol, and ceria sol. Examples of the solvent include water and organic solvents.

The drying temperature is, for example, 60° C. or more and 120° C. or less, and the drying time is, for example, 0.1 hour or more and 1 hour or less. The calcining temperature is, for example, 300° C. or more and 700° C. or less, and the calcining time is, for example, 1 hour or more and 10 hours or less. Calcining may be performed, for example, in an air atmosphere.

Second Embodiment

Hereinafter, an exhaust gas purification catalyst 1B according to a second embodiment of the present invention will be described with reference to FIG. 5. In the exhaust gas purification catalyst 1B, the same members and portions as those of the exhaust gas purification catalyst 1A are denoted by the same reference signs as those of the exhaust gas purification catalyst 1A. Unless otherwise specified, the above descriptions regarding the exhaust gas purification catalyst 1A also apply to the exhaust gas purification catalyst 1B.

As shown in FIG. 5, the second catalyst layer 30 is provided upstream of the first catalyst layer 20. That is, the second catalyst layer 30 is provided on the exhaust gas inflow side of the partition wall 12 of the substrate 10, and the first catalyst layer 20 is provided on the exhaust gas outflow side of the partition wall 12 of the substrate 10. The exhaust gas purification catalyst 1B differs from the exhaust gas purification catalyst 1A in that the second catalyst layer 30 is provided upstream of the first catalyst layer 20. The exhaust gas purification catalyst 1B are the same as the exhaust gas purification catalyst 1A, except for the above point, and exhibits the same effects as the exhaust gas purification catalyst 1A.

The expression that "the second catalyst layer 30 is provided upstream of the first catalyst layer 20" means that a part or the whole of the second catalyst layer 30 is present in, of the surface on the cell 13 side of the partition wall 12 of the substrate 10, a region located upstream of a region in which the first catalyst layer 20 is provided, in the exhaust gas flow direction X. The expression "the surface on the cell 13 side of the partition wall 12" means the outer surface of the partition wall 12, extending in the exhaust gas flow direction X.

As shown in FIG. 5, the first catalyst layer 20 extends from the end on the exhaust gas outflow side of the partition wall 12 along the direction opposite to the exhaust gas flow direction X so as not to reach the end on the exhaust gas inflow side of the partition wall 12, and the second catalyst layer 30 extends from the end on the exhaust gas inflow side of the partition wall 12 along the exhaust gas flow direction X so as not to reach the end on the exhaust gas outflow side of the partition wall 12.

In the exhaust gas purification catalyst 1B, the second catalyst layer 30 is provided upstream of the first catalyst layer 20. Thus, exhaust gas that has flowed in from the end (opening) on the exhaust gas inflow side of the cell 13 contacts with the second catalyst layer 30, and then contacts with the first catalyst layer 20. When the exhaust gas contacts with the second catalyst layer 30, phosphorus in the exhaust gas is captured by barium sulfate in the second catalyst layer 30. This prevents phosphorus from poisoning Pd and/or Pt contained in the first catalyst layer 20.

The exhaust gas purification catalyst 1B can be produced by the following method. The end on the exhaust gas inflow side of the substrate 10 is dipped in the slurry for forming the second catalyst layer 30, and the slurry is suctioned from the opposite side, followed by drying. In this manner, a precursor of the second catalyst layer 30 is formed. The end on the exhaust gas outflow side of the substrate 10 is dipped in the slurry for forming the first catalyst layer 20, and the slurry is suctioned from the opposite side, followed by drying. In this manner, a precursor of the first catalyst layer 20 is formed. After the formation of the precursors of the first catalyst layer 20 and the second catalyst layer 30, the resulting substrate is calcined. In this manner, the first catalyst layer 20 and the second catalyst layer 30 are formed, and the exhaust gas purification catalyst 1B is produced. The production conditions and the like of the exhaust gas purification catalyst 1B are the same as those of the exhaust gas purification catalyst 1A.

EXAMPLES

Examples 1 to 7 and Comparative Examples 1 to 5

(1) Formation of Lower Layer

To a vessel in which pure water was placed, a palladium nitrate solution, a Ce—Zr-based oxide, an alumina, and a binder were added successively, and thoroughly stirred and mixed to obtain a slurry for lower layer.

A stainless steel metal honeycomb substrate (diameter: 40 mm, length: 120 mm, cell density: 400 cells/square inch, volume: 151 mL) was immersed in the slurry for lower layer, excess slurry was removed, and the slurry for lower layer was applied onto the wall inside the substrate. The substrate to which the slurry for lower layer had been applied was dried at 80° C. for 1 hour, and then calcined at 500° C. for 4 hours to form a lower layer on the wall inside the substrate. The mass of the lower layer per unit volume of the substrate (mass after drying and calcining) was 81 g/L. The mass of Pd in the lower layer per unit volume of the substrate was 0.32 g/L in terms of metal. The total mass of the Ce—Zr-based oxide and alumina in the lower layer per unit volume of the substrate was 81 g/L.

(2) Formation of Upper Layer

To a vessel in which pure water was placed, a rhodium nitrate solution, a dinitrodiammineplatinum(II) solution, a Ce—Zr-based oxide, an alumina (θ-alumina in Example 7, γ-alumina in all cases except Example 7), a barium salt (barium hydroxide in Comparative Example 5, barium sulfate in all cases except Comparative Example 5), and a binder (zirconia sol) were added successively, and thoroughly stirred and mixed to obtain a slurry for upper layer. The composition of the slurry for upper layer was adjusted so that the composition of an upper layer formed from the slurry for upper layer would be the composition shown in Table 1. In Table 1, "Rh/Ba" represents the ratio (mole ratio) of the content of Rh to the content of Ba. Of the content of Al in the upper layer, the proportion of the content of Al derived from the alumina, and of the content of Ce in the upper layer, the proportion of the content of Ce derived from the Ce—Zr-based oxide are both 100% by mass.

The substrate on which the lower layer had been formed was immersed in the slurry for upper layer, excess slurry was removed, and the slurry for upper layer was applied onto the lower layer. The substrate to which the slurry for upper layer had been applied was dried at 80° C. for 1 hour, and then calcined at 500° C. for 4 hours to form an upper layer on the lower layer. The mass of Rh in the upper layer per unit volume of the substrate was 0.018 g/L in terms of metal. The mass of Pt in the upper layer per unit volume of the substrate was 0.018 g/L in terms of metal. The mass of the upper layer per unit volume of the substrate (mass after drying and calcining) was 81 g/L.

(3) Phosphorus Poisoning Durability Test

The exhaust gas purification catalyst produced in (2) above was installed in an exhaust pipe, and a thermocouple was inserted in the center of the honeycomb substrate. This exhaust pipe was set in a gasoline engine (displacement: 2300 cc, fuel: gasoline with engine oil added), the engine speed/torque, etc. were adjusted so that the thermocouple temperature reached a predetermined temperature of 850° C. to 1000° C., and a 60-second cycle, varying the A/F (air/fuel) in the order of 12.5, 14.6, and 20.0, was repeated for 40 hours.

(4) Evaluation of Exhaust Gas Purification Performance

After the phosphorus poisoning durability test, the exhaust gas purification catalyst cored to 15 mL was incorporated into the muffler of a motorcycle, and NOx emissions (mg/km) were measured under the following conditions. The results are shown in Table 2.

Vehicle used: single cylinder 125 cc motorcycle

Fuel: unleaded gasoline

Driving mode: WMTC

Measurement method: in accordance with ISO6460

TABLE 1

| | Composition of upper layer | | | | | | | | | |
|---|---|---|---|---|---|---|---|---|---|---|
| | Content of each element/total content of all metal elements (mole ratio) | | | | | | | Rh/Ba | Crystalline phase of | |
| | Rh | Pt | Al | Ba | Ce | Zr | others | (mole ratio) | alumina | Ba source |
| Example 1 | $1.5 \times 10^{-4}$ | $8.1 \times 10^{-5}$ | 0.60 | 0.037 | 0.037 | 0.28 | 0.040 | 0.0041 | γ | Barium sulfate |
| Example 2 | $1.6 \times 10^{-4}$ | $8.4 \times 10^{-5}$ | 0.76 | 0.032 | 0.027 | 0.16 | 0.025 | 0.0050 | γ | Barium sulfate |
| Example 3 | $1.5 \times 10^{-4}$ | $8.0 \times 10^{-5}$ | 0.80 | 0.030 | 0.025 | 0.12 | 0.022 | 0.0050 | γ | Barium sulfate |
| Example 4 | $1.6 \times 10^{-4}$ | $8.3 \times 10^{-5}$ | 0.75 | 0.016 | 0.028 | 0.18 | 0.028 | 0.010 | γ | Barium sulfate |
| Example 5 | $1.8 \times 10^{-4}$ | $9.6 \times 10^{-5}$ | 0.59 | 0.006 | 0.038 | 0.32 | 0.045 | 0.030 | γ | Barium sulfate |
| Example 6 | $1.6 \times 10^{-4}$ | $8.5 \times 10^{-5}$ | 0.77 | 0.032 | 0.067 | 0.11 | 0.024 | 0.0050 | γ | Barium sulfate |
| Example 7 | $1.6 \times 10^{-4}$ | $8.3 \times 10^{-5}$ | 0.77 | 0.031 | 0.027 | 0.15 | 0.019 | 0.0050 | θ | Barium sulfate |
| Comparative Example 1 | $2.1 \times 10^{-4}$ | $1.1 \times 10^{-4}$ | 0.50 | 0.041 | 0.043 | 0.37 | 0.049 | 0.0050 | γ | Barium sulfate |
| Comparative Example 2 | $1.3 \times 10^{-4}$ | $7.1 \times 10^{-5}$ | 0.90 | 0.027 | 0.019 | 0.04 | 0.012 | 0.0050 | γ | Barium sulfate |
| Comparative Example 3 | $1.6 \times 10^{-4}$ | $8.6 \times 10^{-5}$ | 0.78 | 0.065 | 0.026 | 0.11 | 0.019 | 0.0025 | γ | Barium sulfate |
| Comparative Example 4 | $1.6 \times 10^{-4}$ | $8.2 \times 10^{-5}$ | 0.74 | 0.003 | 0.029 | 0.19 | 0.031 | 0.049 | γ | Barium sulfate |
| Comparative Example 5 | $1.6 \times 10^{-4}$ | $8.3 \times 10^{-5}$ | 0.76 | 0.037 | 0.027 | 0.15 | 0.025 | 0.0042 | γ | Barium hydroxide |

TABLE 2

| | NOx emissions (mg/km) |
|---|---|
| Example 1 | 57 |
| Example 2 | 54 |
| Example 3 | 54 |
| Example 4 | 56 |
| Example 5 | 58 |
| Example 6 | 58 |
| Example 7 | 60 |
| Comparative Example 1 | 65 |
| Comparative Example 2 | 66 |

TABLE 2-continued

| | NOx emissions (mg/km) |
|---|---|
| Comparative Example 3 | 61 |
| Comparative Example 4 | 61 |
| Comparative Example 5 | 62 |

As shown in Tables 1 and 2, the exhaust gas purification catalysts of Examples 1 to 7, which satisfy the following conditions: (1) the lower layer contains at least one selected from Pd and Pt; (2) the upper layer contains Rh, Al, and barium sulfate; (3) the mole ratio of the content of Al in the upper layer to the total content of all metal elements in the upper layer is 0.55 or more and 0.85 or less; and (4) the mole ratio of the content of Rh in the upper layer to the content of Ba in the upper layer is 0.0040 or more and 0.040 or less, had higher exhaust gas purification performance (NOx purification performance) after the phosphorus poisoning durability test compared to the exhaust gas purification catalysts of Comparative Examples 1 to 5, which do not satisfy any one or more of (2) to (4).

DESCRIPTION OF REFERENCE SIGNS

1A, 1B . . . exhaust gas purification catalyst

10 . . . substrate

11 . . . tubular member

12 . . . partition wall

13 . . . cell

20 . . . first catalyst layer

30 . . . second catalyst layer

The invention claimed is:

1. An exhaust gas purification catalyst, comprising a substrate and first and second catalyst layers each provided on the substrate, wherein the second catalyst layer is provided on an upside or upstream of the first catalyst layer, wherein the first catalyst layer comprises at least one selected from Pd and Pt, wherein the second catalyst layer comprises Rh, Al, and barium sulfate, wherein a mole ratio of a content of Al in the second catalyst layer to a total content of all metal elements in the second catalyst layer is 0.55 or more and 0.85 or less, and wherein a mole ratio of a content of Rh in the second catalyst layer to a content of Ba in the second catalyst layer is 0.0040 or more and 0.040 or less.

2. The exhaust gas purification catalyst according to claim 1, wherein the second catalyst layer comprises a γ-alumina phase.

3. The exhaust gas purification catalyst according to claim 1, wherein the second catalyst layer further comprises at least one selected from Pd and Pt.

4. The exhaust gas purification catalyst according to claim 1, wherein the second catalyst layer further comprises Ce, and wherein a mole ratio of a content of Ce in the second catalyst layer to a total content of all metal elements in the second catalyst layer is 0.020 or more and 0.050 or less.

* * * * *